United States Patent
Gupta et al.

(10) Patent No.: US 11,086,535 B2
(45) Date of Patent: *Aug. 10, 2021

(54) THIN PROVISIONING USING CLOUD BASED RANKS

(71) Applicant: International Business Machines Corporation, Armonk, NY (US)

(72) Inventors: Lokesh Gupta, Tucson, AZ (US); Matthew G. Borlick, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 4 days.

This patent is subject to a terminal disclaimer.

(21) Appl. No.: 16/521,722

(22) Filed: Jul. 25, 2019

(65) Prior Publication Data
US 2019/0347024 A1 Nov. 14, 2019

Related U.S. Application Data

(63) Continuation of application No. 15/704,712, filed on Sep. 14, 2017, now Pat. No. 10,372,363.

(51) Int. Cl.
*G06F 12/00* (2006.01)
*G06F 3/06* (2006.01)
(Continued)

(52) U.S. Cl.
CPC .......... *G06F 3/0631* (2013.01); *G06F 3/0604* (2013.01); *G06F 3/067* (2013.01);
(Continued)

(58) Field of Classification Search
CPC .... G06F 3/0631; G06F 3/0604; G06F 3/0659; G06F 3/0665; G06F 3/0689;
(Continued)

(56) References Cited

U.S. PATENT DOCUMENTS 5,978,892 A * 11/1999 Noel ............... G06F 12/023
707/999.202
6,269,431 B1 7/2001 Dunham
(Continued)

FOREIGN PATENT DOCUMENTS

CN 101719106 A 6/2010
CN 102467408 A 5/2012
(Continued)

OTHER PUBLICATIONS

Anonymous, "A system and method to create a cost efficient mobility solution of storing data in public clouds", An Ip.com Prior Art Database Technical Disclosure. IP.com No. IPCOM000232553D, Nov. 15, 2013. 10 pages.
(Continued)

*Primary Examiner* — Mark A Giardino, Jr.
(74) *Attorney, Agent, or Firm* — James L. Olsen

(57) ABSTRACT

A computer-implemented method for thin provisioning using cloud based ranks comprises determining a total amount of unused physical storage space for all of a plurality of local ranks associated with a storage controller; comparing the total amount of unused physical storage space to a first threshold; in response to determining that the total amount of unused physical storage space is less than the first threshold, creating one or more cloud based ranks. Creating each of the one or more cloud based ranks comprises allocating storage space on one or more corresponding cloud storage devices via a cloud interface; mapping the allocated storage space to corresponding virtual local addresses; and grouping the virtual local addresses as a virtual local rank associated with the storage controller.

17 Claims, 4 Drawing Sheets

(51) Int. Cl.
*H04L 29/08* (2006.01)
*G06F 13/00* (2006.01)
*G06F 13/28* (2006.01)

(52) U.S. Cl.
CPC .......... *G06F 3/0647* (2013.01); *G06F 3/0653* (2013.01); *G06F 3/0659* (2013.01); *G06F 3/0665* (2013.01); *G06F 3/0689* (2013.01); *H04L 67/1097* (2013.01)

(58) Field of Classification Search
CPC ...... G06F 3/0653; G06F 3/0647; G06F 3/067; H04L 67/1097
See application file for complete search history.

(56) References Cited

U.S. PATENT DOCUMENTS

| | | | |
|---|---|---|---|
| 6,996,741 | B1 | 2/2006 | Pittelkow |
| 7,028,158 | B1 | 4/2006 | Beatty |
| 7,225,211 | B1 | 5/2007 | Colgrove |
| 8,370,312 | B1 | 2/2013 | Sawhney |
| 8,484,416 | B2 | 7/2013 | Smith |
| 8,555,022 | B1* | 10/2013 | Edwards ............... G06F 3/0649 711/170 |
| 8,612,284 | B1 | 12/2013 | Sharif |
| 8,745,327 | B1 | 6/2014 | Throop |
| 8,972,778 | B2 | 3/2015 | Kulkarni |
| 9,021,204 | B1 | 4/2015 | Awasthi |
| 9,128,948 | B1 | 9/2015 | Raorane |
| 9,210,100 | B2 | 12/2015 | Van Der Linden |
| 9,268,493 | B2 | 2/2016 | Kamalavannan |
| 9,378,093 | B2 | 6/2016 | Cooper |
| 9,411,539 | B2 | 8/2016 | Chiu |
| 9,432,298 | B1 | 8/2016 | Smith |
| 9,454,473 | B2 | 9/2016 | Luan |
| 9,513,968 | B1 | 12/2016 | Fiske |
| 9,552,248 | B2 | 1/2017 | Miller |
| 9,632,707 | B2 | 4/2017 | Hyde, II |
| 9,646,010 | B2 | 5/2017 | Mokhtarzada |
| 9,665,303 | B1 | 5/2017 | Huff |
| 9,749,193 | B1 | 8/2017 | Rokicki |
| 10,237,343 | B1 | 3/2019 | Wigmore |
| 2008/0154776 | A1 | 6/2008 | Xia |
| 2008/0201523 | A1 | 8/2008 | Ash |
| 2010/0042720 | A1 | 2/2010 | Stienhans |
| 2010/0131324 | A1 | 5/2010 | Ferris |
| 2010/0161759 | A1 | 6/2010 | Brand |
| 2010/0333116 | A1 | 12/2010 | Prahlad |
| 2011/0022812 | A1 | 1/2011 | Van Der Linden |
| 2011/0271067 | A1 | 11/2011 | Chou |
| 2012/0016838 | A1 | 1/2012 | Arai |
| 2012/0047107 | A1 | 2/2012 | Doddavula |
| 2012/0246310 | A1 | 9/2012 | Broda |
| 2013/0159637 | A1 | 6/2013 | Forgette |
| 2013/0212345 | A1 | 8/2013 | Nakajima |
| 2013/0218919 | A1 | 8/2013 | Solonchev |
| 2013/0332700 | A1* | 12/2013 | Kopylovitz ........... G06F 3/0631 711/209 |
| 2014/0052864 | A1 | 2/2014 | Van Der Linden |
| 2014/0223576 | A1 | 8/2014 | Zhao |
| 2014/0280387 | A1 | 9/2014 | Lin |
| 2014/0337576 | A1 | 11/2014 | Burton |
| 2015/0112944 | A1 | 4/2015 | Wu |
| 2015/0227468 | A1 | 8/2015 | Berger |
| 2016/0004481 | A1 | 1/2016 | Lakshman |
| 2016/0048532 | A1 | 2/2016 | Islam |
| 2016/0139835 | A1* | 5/2016 | Fiebrich-Kandler ....................... G06F 3/0608 711/114 |
| 2016/0162438 | A1 | 6/2016 | Hussain |
| 2016/0197834 | A1 | 7/2016 | Luft |
| 2016/0314079 | A1 | 10/2016 | Medovich |
| 2016/0378518 | A1 | 12/2016 | Antony |
| 2017/0013057 | A1 | 1/2017 | Shani |
| 2017/0039218 | A1 | 2/2017 | Prahlad |
| 2017/0262347 | A1* | 9/2017 | Dornemann ........ G06F 9/45558 |
| 2017/0277435 | A1 | 9/2017 | Wadhwa |
| 2018/0024853 | A1 | 1/2018 | Warfield |
| 2018/0113734 | A1 | 4/2018 | Yamato |
| 2019/0079686 | A1 | 3/2019 | Gupta |
| 2019/0079693 | A1 | 3/2019 | Gupta |
| 2019/0082008 | A1 | 3/2019 | Gupta |
| 2019/0082009 | A1 | 3/2019 | Gupta |
| 2019/0095458 | A1 | 3/2019 | Saradhi |
| 2019/0179805 | A1 | 6/2019 | Prahlad |

FOREIGN PATENT DOCUMENTS

| | | |
|---|---|---|
| CN | 104820575 A | 8/2015 |
| CN | 105827669 A | 8/2016 |
| WO | 2019053533 A1 | 3/2019 |
| WO | 2019053534 A1 | 3/2019 |

OTHER PUBLICATIONS

Anonymous, "Data Migration and I/O Throttling to Reduce Temperature Hot Spots in a storage controller", An IP.com Prior Art Database Technical Disclosure. IP.com No. IPCOM000208028D. Jun. 20, 2011. 4 pages.

Anonymous, "Define virtual storage pool attributes based on storage volumes to be migrated", An IP.com Prior Art Database Technical Disclosure. IP.com No. IPCOM000234650D, Jan. 24, 2014. 7 pages.

Anonymous, "Dynamic Model for Storage in a Cloud Environment With Quality of Service Feature", An IP.com Prior Art Database Technical Disclosure. IP.com No. IPCOM000209739D, Aug. 12, 2011. 5 pages.

Anonymous, "Method and System for Assigning Storage Access Priorities to Input/output Intensive Host Applications in a Cloud Storage Network", An IP.com Prior Art Database Technical Disclosure. IP.com No. IPCOM000236547D, May 2, 2014. 7 pages.

Anonymous, "Method and System for Pre-Allocating Virtual Disks in a Cloud Environment", An IP.com Prior Art Database Technical Disclosure. IP.com No. IPCOM000220121D, Jul. 23, 2012. 3 pages.

Anonymous, "Optimize data migration in a system which mixes local storage devices and Cloud Storage", An IP.com Prior Art Database Technical Disclosure. IP.com No. IPCOM000238089D, Aug. 1, 2014. 4 pages.

Anonymous, "Policy-driven method and system to automate the provisioning of shared storage space in a cloud environment", An IP.com Prior Art Database Technical Disclosure. IP.com No. IPCOM000220017D, Jul. 18, 2012. 5 pages.

Anonymous, "Smart Device Cloud", An IP.com Prior Art Database Technical Disclosure. IP.com No. IPCOM000206936D, May 13, 2011. 15 pages.

Anonymous, "Smarter Method to Achieve Multi-tenancy at the RAID Level", An IP.com Prior Art Database Technical Disclosure. IP.com No. IPCOM000204434D, Feb. 24, 2011. 6 pages.

Anonymous, "System and method for enhancing high data rate mobile application performance by tiering between multiple storage cards", An IP.com Prior Art Database Technical Disclosure. IP.com No. IPCOM000245740D, Apr. 4, 2016. 10 pages.

Dufrasne et al., "IBM DS8000 Easy Tier", IBM Redbooks, International Technical Support Organization, Aug. 2016. http://www.redbooks.ibm.com/abstracts/redp4667.html 166 pages.

Gupta et al., "Dynamic Data Relocation Using Cloud Based Ranks", U.S. Appl. No. 16/521,782, filed Jul. 25, 2019.

IBM, "Rules Based Storage Cloud", An IP.com Prior Art Database Technical Disclosure. IP.com No. IPCOM000181667D, Apr. 8, 2009. 3 pages.

International Search Report and Written Opinion for International Application No. PCT/IB2018/056279, filed Aug. 20, 2018.

International Search Report and Written Opinion for International Application No. PCT/IB2018/056280 filed Aug. 20, 2018.

International Search Report and Written Opinion for International Application No. PCT/IB2018/056795, filed Sep. 6, 2018.

List of Patents or Patent Applications Treated as Related, dated Jul. 24, 2019. 2 pages.

(56) References Cited

OTHER PUBLICATIONS

Mell et al., "The NIST Definition of Cloud Computing", National Institute of Standards and Technology, Special Publication 800-145, Sep. 2011. 7 pages.

Ruiu et al., "Automatic Dynamic Allocation of Cloud Storage for Scientific Applications," 2015 Ninth International Conference on Complex, Intelligent, and Software Intensive Systems, Aug. 13, 2015, pp. 209-216.

Unknown, "Amazon S3 Reduced Redundancy Storage", Amazon, 2017. https://aws.amazon.com/s3/reduced-redundancy/ last accessed Aug. 24, 2017. 7 pages.

Unknown, "Amazon S3 Storage Classes", https://aws.amazon.com/s3/storage-classes/ last accessed Aug. 24, 2017. 7 pages.

Unknown, "Amazon S3", Amazon, 2017. https://aws.amazon.com/s3/, last accessed Aug. 24, 2017. 9 pages.

Unknown, "Cloud-integrated Storage—What & Why", Microsoft, Mar. 2013. 10 pages.

Unknown, "Cohesity Cloud Integration Solution Overview and Value Proposition", Cohesity, 2016. 2 pages.

Unknown, "Disk Storage DS8000 Overview", Lascon Storage, http://www.lascon.co.uk/hwd-ds8k-overview.php last accessed Aug. 24, 2017. 6 pages.

Unknown, "HyperSwap function", IBM, 2016. https://www.ibm.com/support/knowledgecenter/en/STVLF4_7.7.1/spectrum.virtualize.771.doc/svc_hyperswapovr.html 1 page.

Unknown, "IBM Easy Tier", IBM, Jun. 5, 2015. https://www.ibm.com/support/knowledgecenter/en/HW213_7.3.0/com.ibm.storage.ssic.help.doc/f2c_autodatareloc)lfa4gd.html 4 pages.

Unknown, "Overview of IBM Cloud Manager with OpenStack", IBM, 2015. https://www.ibm.com/support/knowledgecenter/en/SST55W_4.3.0/liaca/liaca_overview.html 1 page.

Unknown, "Types of Data Replication", IBM, Copyright 2002, 2009. https://www.ibm.com/support/knowledgecenter/en/SSSKXG_1.4.0.1/com.ibm.sspc_v1401.doc/frg_c_sspc_ct.html 10 pages.

Westphal et al., "IBM System Storage DS8000 Architecture and Implementation", IBM Redbooks, International Technical Support Organization, Nov. 2012. www.redbooks.ibm.com/redbooks/pdfs/sg248886.pdf 534 pages.

* cited by examiner

THIN PROVISIONING USING CLOUD BASED RANKS

BACKGROUND

Storage networks, such as storage area networks (SANs), are used to interconnect different types of data storage systems with different types of servers (also referred to herein as "host systems"). Some servers involve various hardware such as data storage media, storage controllers, memories, and the accompanying power systems, cooling systems, etc.

Storage controllers control access to data storage media and memories in response to read and write requests. The storage controllers may direct the data in accordance with data storage devices such as RAID (redundant array of independent disks), JBOD (just a bunch of disks), and other redundancy and security levels. As an example, an IBM® ESS (Enterprise Storage Server) such as a DS8000 series has redundant clusters of computer entities, cache, non-volatile storage, etc.

SUMMARY

Aspects of the disclosure may include a computer implemented method, computer program product, computing device, and system for thin provisioning using cloud based ranks. An example method comprises determining a total amount of unused physical storage space for all of a plurality of local ranks associated with a storage controller; comparing the total amount of unused physical storage space to a first threshold; in response to determining that the total amount of unused physical storage space is less than the first threshold, creating one or more cloud based ranks. Creating each of the one or more cloud based ranks comprises allocating storage space on one or more corresponding cloud storage devices via a cloud interface; mapping the allocated storage space to corresponding virtual local addresses; and grouping the virtual local addresses as a virtual local rank associated with the storage controller.

The above summary is not intended to describe each illustrated embodiment or every implementation of the present disclosure

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
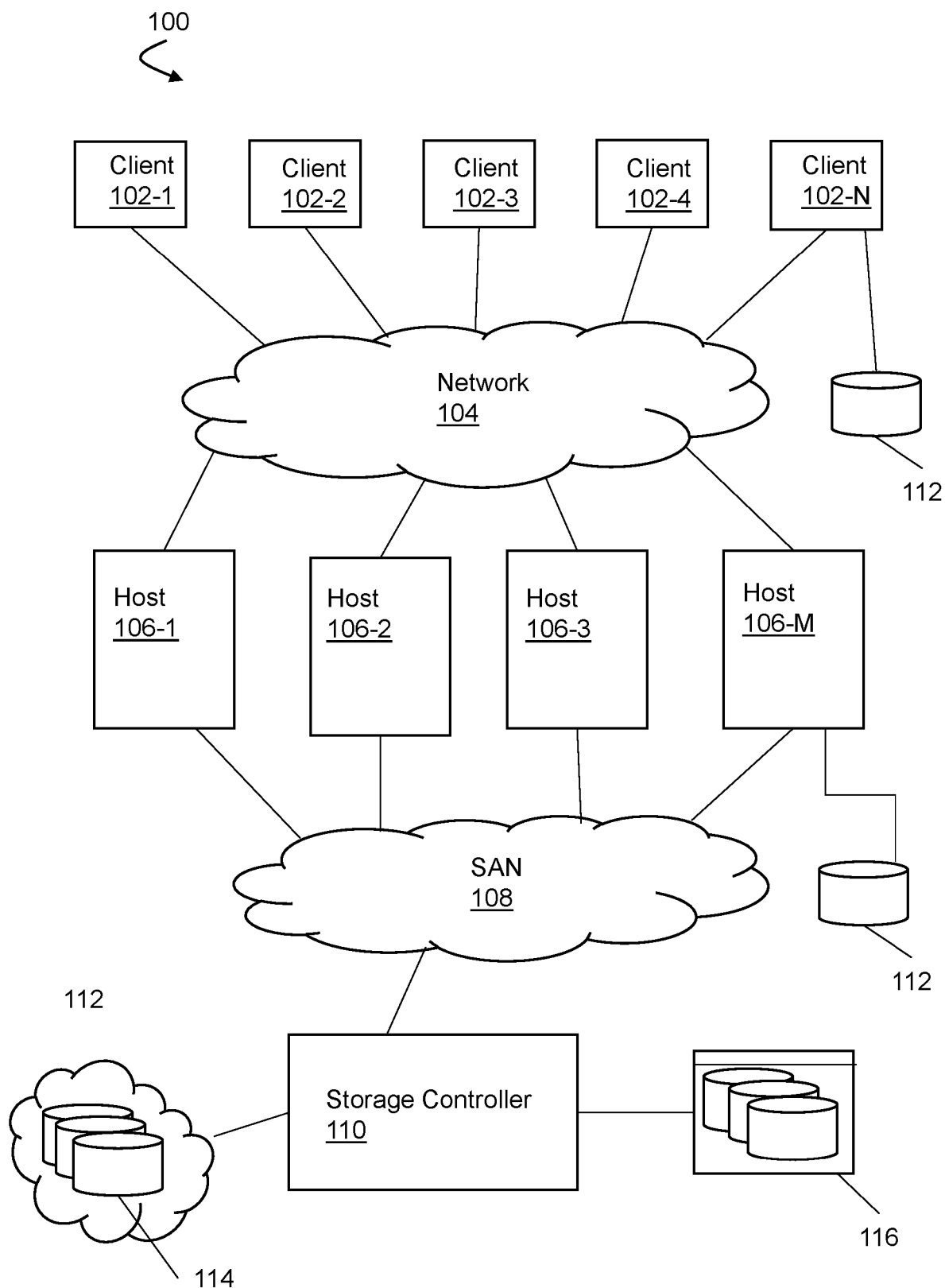
FIG. 1 is a high-level block diagram depicting one embodiment of an example network environment.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, the phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. Additionally, the term "a" or "an" entity refers to one or more of that entity. As such, the terms "a" (or "an"), "one or more" and "at least one" can be used interchangeably herein. It is also to be noted that the terms "comprising," "including," and "having" can be used interchangeably. The term "automatic" and variations thereof, as used herein, refers to any process or operation done without material human input when the process or operation is performed. Human input is deemed to be material if such input directs or controls how or when the process or operation is performed. A process which uses human input is still deemed automatic if the input does not direct or control how or when the process is executed.

The terms "determine", "calculate" and "compute," and variations thereof, as used herein, are used interchangeably and include any type of methodology, process, mathematical operation or technique. Hereinafter, "in communication" or "communicatively coupled" shall mean any electrical connection, whether wireless or wired, that allows two or more systems, components, modules, devices, etc. to exchange data, signals, or other information using any protocol or format. Furthermore, two components that are communicatively coupled need not be directly coupled to one another, but can also be coupled together via other intermediate components or devices.

FIG. 1 is a high-level block diagram depicting one embodiment of an example network architecture 100. The network architecture 100 is presented only by way of example and not limitation. Indeed, the systems and methods disclosed herein may be applicable to a wide variety of different network architectures in addition to the network architecture 100 shown in FIG. 1.

As shown, the network architecture 100 includes one or more clients or client computers 102-1 . . . 102-N, where N is the total number of client computers, and one or more hosts 106-1 . . . 106-M, where M is the total number of hosts (also referred to herein as "server computers" 106, "host systems" 106, or "host devices" 106). It is to be understood that although five clients 102 are shown in FIG. 1, other numbers of clients 102 can be used in other embodiments. For example, in some embodiments only one client 102 is implemented. In other embodiments, more than five or fewer than 5 clients 102 are used. Similarly, it is to be understood that although four hosts 106 are shown in FIG. 1, any suitable number of hosts 106 can be used. For example, in some embodiments, only a single host 106 is used. In other embodiments, more than four or fewer than four storage hosts 106 can be used.

Each of the client computers 102 can be implemented as a desktop computer, portable computer, laptop or notebook computer, netbook, tablet computer, pocket computer, smart phone, or any other suitable type of electronic device.

Similarly, each of the hosts 106 can be implemented using any suitable host computer or server. Such servers can include, but are not limited to, IBM System z® and IBM System i® servers, as well as UNIX servers, Microsoft Windows servers, and Linux platforms.

The client computers 102 are communicatively coupled to hosts 106 via a network 104. The network 104 may include, for example, a local-area-network (LAN), a wide-area-network (WAN), the Internet, an intranet, or the like. In general, the client computers 102 initiate communication sessions, whereas the server computers 106 wait for requests from the client computers 102. In certain embodiments, the computers 102 and/or servers 106 may connect to one or more internal or external direct-attached storage systems 112 (e.g., arrays of hard-disk drives, solid-state drives, tape drives, etc.). These computers 102, 106 and direct-attached storage systems 112 may communicate using protocols such as ATA, SATA, SCSI, SAS, Fibre Channel, or the like.

The network architecture 100 may, in certain embodiments, include a storage network 108 behind the servers 106, such as a storage-area-network (SAN) 108 or a LAN 108 (e.g., when using network-attached storage). In the example shown in FIG. 1, the network 108 connects the servers 106 to one or more storage sub-systems 110. Although only one storage sub-system 110 is shown for purposes of illustration, it is to be understood that more than one storage sub-system 110 can be used in other embodiments. The storage sub-system 110 manages connections to arrays of storage devices 116. The arrays of storage devices 116 can include arrays of hard-disk drives and/or solid-state drives. To access the storage sub-system 110, a host system 106 may communicate over physical connections from one or more ports on the host 106 to one or more ports on the storage sub-system 110. A connection may be through a switch, fabric, direct connection, or the like. In certain embodiments, the servers 106 and storage sub-systems 110 may communicate using a networking standard such as Fibre Channel (FC) or iSCSI.

In conventional systems, it can be difficult and/or costly to determine how much storage capacity to provision. Some systems utilize a technique referred to as thin provisioning which provisions more logical storage space than the available physical storage space. As more physical storage space is needed due to stored data growing, additional storage drives are configured and added to increase capacity. However, this can introduce downtime where services are not available as well as additional cost to purchase, configure and install new storage drives. Additionally, if a new write occurs when there is no more physical space and additional capacity has not yet been added, the new write will fail. In contrast, if more capacity is provisioned than needed, then the space goes unused and results in an inefficient use of storage space and cost to initially provision.

Although cloud storage services exist which can provide a relatively cost effective way of storing data for basic needs, such as for archiving, conventional uses of cloud storage services do not provide the same features and benefits of an enterprise storage system having locally connected storage arrays, such as advanced management features discussed below. In contrast to conventional enterprise storage systems and conventional cloud storage services, the embodiments described herein leverage the availability of cloud storage drives to create storage arrays from the cloud storage in a manner that the cloud storage appears as a local storage array for the enterprise storage system which enables advanced data management features for data stored in the cloud as well as makes thin provisioning more seamless (e.g. less service interruptions when capacity is needed/added), as described in more detail below. In particular, the embodiments described herein can dynamically add storage arrays for the storage controller when demand is needed while still enabling the same features available to local storage arrays for data stored on virtual cloud arrays. Thus, the embodiments described herein provide a solution to enabling benefits of an enterprise storage system for data stored on cloud storage drives and for making thin provisioning more seamless.

Figure 2:
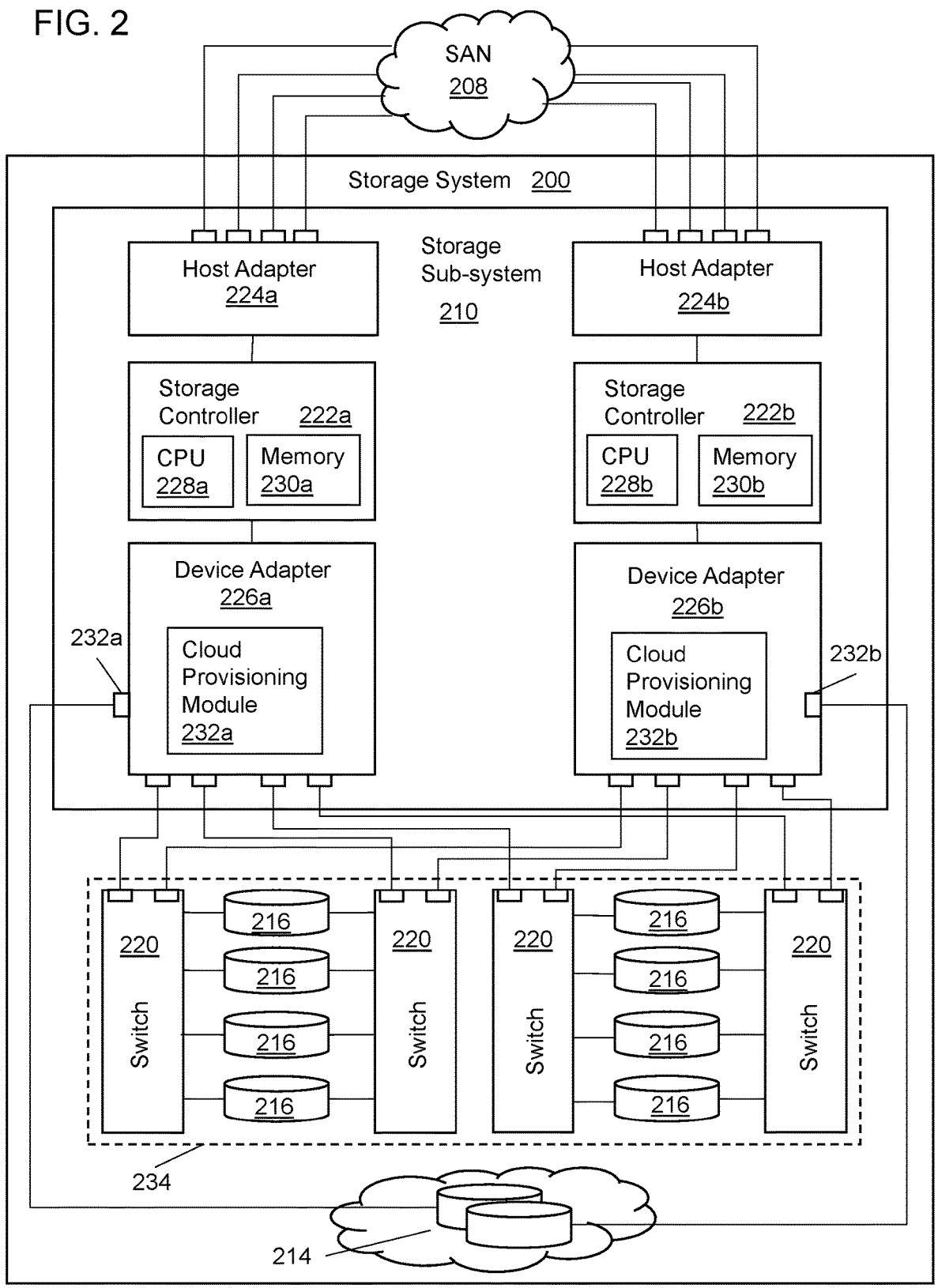
FIG. 2 is a high-level block diagram depicting one embodiment of an example storage system.

FIG. 2 is a high-level block diagram of one embodiment of a storage system 200. Storage system 200 includes one or more arrays of storage drives (e.g., hard-disk drives and/or solid-state drives). As shown, the storage system 200 includes a storage sub-system 210, a plurality of switches 202, and a plurality of storage drives 216 such as hard disk drives and/or solid-state drives (such as flash-memory-based drives). The storage sub-system 210 may enable one or more hosts (e.g., open system and/or mainframe servers) to access data in the plurality of storage drives 216.

In some embodiments, the storage sub-system 210 includes one or more storage controllers 222. In the example shown in FIG. 2, the storage sub-system includes storage controller 222a and storage controller 222b. Although only two storage controllers 226 are shown herein for purposes of explanation, it is to be understood that more than two storage controllers can be used in other embodiments. The storage sub-system 210 in FIG. 2 also includes host adapters 224a, 224b and device adapters 226a, 226b to connect the storage sub-system 210 to host devices and storage drives 204, respectively. Multiple storage controllers 222a, 222b provide redundancy to help ensure that data is available to connected hosts. Thus, when one storage controller (e.g. storage controller 222a) fails, the other storage controller (e.g. 222b) can pick up the I/O load of the failed storage controller to ensure that I/O is able to continue between the hosts and the storage drives 204. This process can be referred to as a "failover."

Each storage controller 222 can include respective one or more processors 228 and memory 230. The memory 230 can include volatile memory (e.g., RAM) as well as non-volatile memory (e.g., ROM, EPROM, EEPROM, flash memory, etc.). The volatile and non-volatile memory can store software modules that run on the processor(s) 228 and are used to access data in the storage drives 204. The storage controllers 222 can host at least one instance of these software modules. These software modules can manage all read and write requests to logical volumes in the storage drives 204.

In particular, each storage controller 222 is communicatively coupled to the storage drives 204 via a respective device adapter 226. Each device adapter 226 is configured to manage Input/Output (I/O) accesses (also referred to herein as data access requests or access requests) to the storage drives 216. For example, the device adapters 226 logically organize the storage drives 216 and determine where to store data on the storage drives 216. The storage drives 216 (also referred to as disk drive modules (DDM)) can include groups of different types of drives having different performance characteristics. For example, the storage drives 216 can include a combination of (relatively) slow 'nearline' disks (e.g. 7,200 revolutions per minute (RPM) rotational speed), SAS disk drives (e.g. 10 k or 15 k RPM) and relatively fast solid state drives (SSD).

The device adapters 226 are coupled to the storage drives 216 via switches 220. Each of the switches 220 can be fiber switches coupling the storage drives 216 to the device adapters via fiber optic connections. The device adapters 226 logically group the storage drives 216 into array sites 234. For purposes of illustration, a single array site 234 comprised of storage drives 216 is depicted in FIG. 2. However, it is to be understood that more than one array site comprised of storage drives 216 can be included in other embodiments. The array site 234 can be formatted as a Redundant Array of Independent Disks (RAID) array 234. It is to be understood that any type of RAID array (e.g. RAID 0, RAID 5, RAID 10, etc.) can be used. Each RAID array is also referred to as a rank. Each rank is divided into a number of equally sized partitions referred to as extents. The size of each extent can vary based on the implementation. For example, the size of each extent can depend, at least in part, on the extent storage type. The extent storage type (e.g. Fixed Block (FB) or count key data (CKD)) is dependent on the type of host coupled to the storage sub-system (e.g. open-systems host or mainframe server). The extents are then grouped to make up logical volumes.

The storage sub-system 210 can enable various management features and functions, such as, but not limited to, full disk encryption, non-volatile storage (NVS) algorithms (e.g. thresholding, stage, destage), storage pool striping (rotate extents), dynamic volume expansion, dynamic data relocation, intelligent write caching, and adaptive multi-stream prefetching. One example of a storage system 210 having an architecture similar to that illustrated in FIG. 2 is the IBM DS8000™ series enterprise storage system. The DS8000™ is a high-performance, high-capacity storage sub-system providing disk and solid-state storage that is designed to support continuous operations. Nevertheless, the embodiments disclosed herein are not limited to the IBM DS8000™ series enterprise storage system, but can be implemented in any comparable or analogous storage system or group of storage systems, regardless of the manufacturer, product name, or components or component names associated with the system. Thus, the IBM DS8000™ is presented only by way of example and is not intended to be limiting.

Additionally, in the embodiment shown in FIG. 2, each of the device adapters 226 includes a respective network port 232, such as an Ethernet port, which communicatively couples the device adapter 226 to cloud storage devices 214 via a network, such as the internet. In the example shown in FIG. 2, each device adapter 226 further includes a respective cloud provisioning module 232 which is configured to allocate and group cloud storage devices 214 into virtual RAID arrays, such that the cloud storage devices 214 appear to the storage controllers 2226 as a local RAID array or rank. In this way, the features and functions of the storage controllers 226 that are available for local ranks, such as RAID array 234, are also available for the cloud rank 214.

As described in more detail below with respect to FIGS. 3 and 4, the cloud provisioning module 232 is configured to convert between storage controller commands and/or I/O accesses and cloud interface commands and/or I/O accesses. It is to be noted that although a cloud provisioning module 232 is included in the device adapters 226 in this example, the cloud provisioning module 232 can be included in storage controllers 222 in other embodiments. In particular, in some embodiments, each storage controller 222 includes a respective cloud provisioning module that does the conversion for commands to the respective device adapter 226.

Thus, the embodiments described herein enable advantages over conventional cloud storage systems. For example, conventional cloud storage systems typically enable relatively basic functionality, such as remote archiving, backup, and retrieval. However, such conventional systems are unable to perform advanced management functions on the data stored in the cloud, such as the management functions mentioned above (e.g. NVS algorithms such as thresholding, stage, and destage). Thus, through the use of the cloud provisioning module 232, discussed in more detail below, the embodiments described herein enable the performance of advanced management features on data stored on cloud storage devices which is not available for conventional cloud storage systems. In particular, through the use of the cloud provisioning module 232, the storage controllers 222 and device adapters 226 are able to access and utilize the virtual RAID arrays or ranks comprised of cloud storage as if the virtual RAID arrays were local drives coupled to the device adapters 226 rather than as remote storage. In this way, the same management features/functionality available for local drives, such as those mentioned above, are available for the remote cloud storage without modifying the underlying code and/or hardware associated with implementing those management features.

Furthermore, by creating virtual RAID arrays that appear as local storage to the storage sub-system 210, the embodiments described herein provide a solution to a problem of enabling more seamless thin provisioning. In particular, the cloud provisioning module 232 is configured to monitor the amount of free space or unused storage space on the plurality of storage devices of the one or more RAID arrays (e.g. array 234) in the storage system. Based on the monitored amount of unused storage space, the cloud provisioning module 232 can to create one or more cloud based ranks to increase capacity of the storage system 200 while enabling the same management features for data on the cloud based ranks. In addition, the creation and addition of the cloud based ranks reduces service interruptions as compared to installing and configuring additional local storage arrays.

Figure 3:
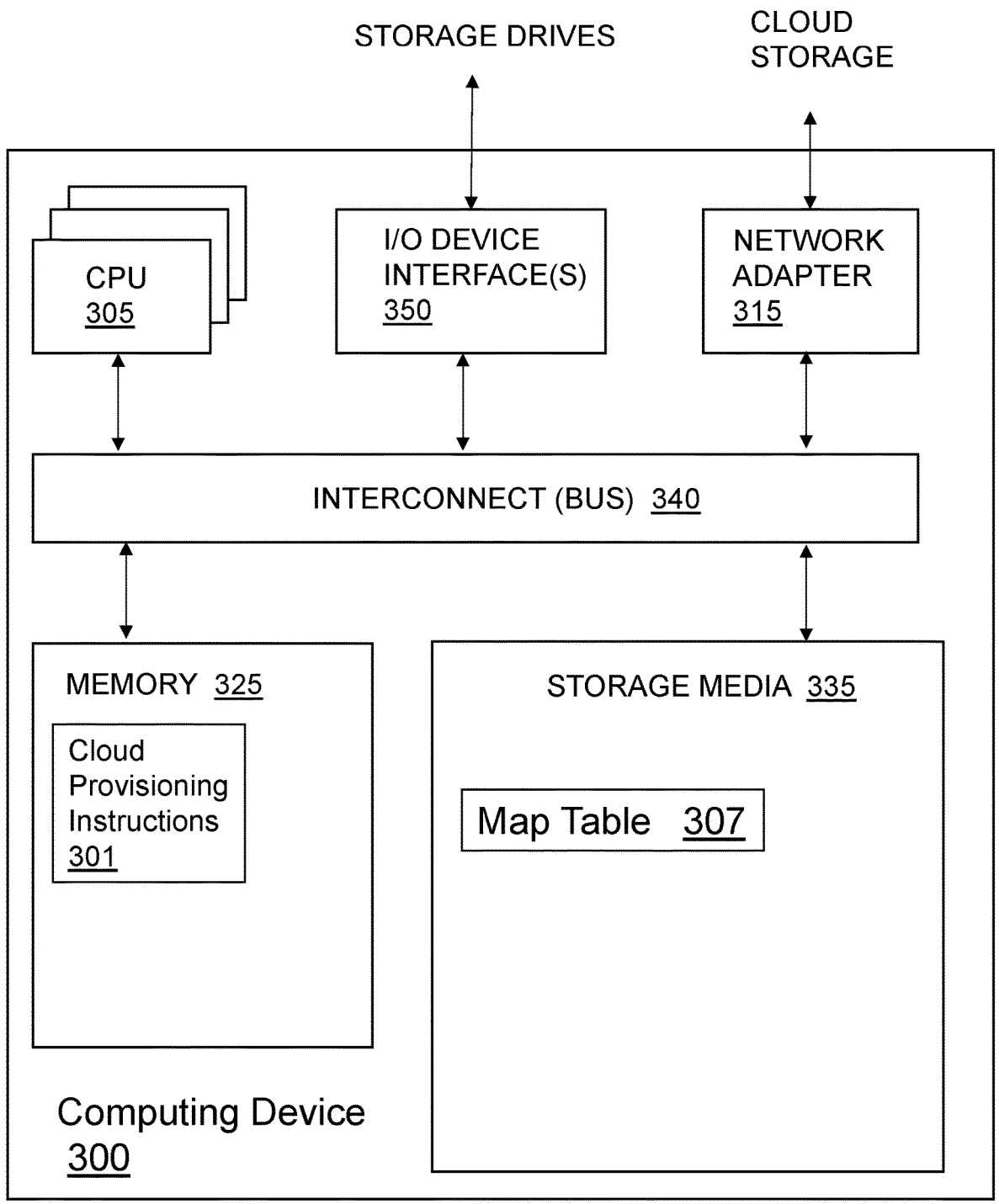
FIG. 3 is a block diagram of one embodiment of an example device adapter.

FIG. 3 is a block diagram of one embodiment of an example computing device 300 which can be implemented as a device adapter, such as device adapters 226 or a storage controller, such as storage controllers 222. For purposes of explanation, computing device 300 is described herein with respect to a device adapter. In the example shown in FIG. 3, the device adapter 300 includes a memory 325, storage 335, an interconnect (e.g., BUS) 340, one or more processors 305 (also referred to as CPU 305 herein), an I/O device interface 350, and a network adapter or port 315.

Each CPU 305 retrieves and executes programming instructions stored in the memory 325 and/or storage 335. The interconnect 340 is used to move data, such as programming instructions, between the CPU 305, I/O device interface 350, storage 335, network adapter 315, and memory 325. The interconnect 340 can be implemented using one or more busses. The CPUs 305 can be a single CPU, multiple CPUs, or a single CPU having multiple processing cores in various embodiments. In some embodiments, a processor 305 can be a digital signal processor (DSP). Memory 325 is generally included to be representative of a random access memory (e.g., static random access memory (SRAM), dynamic random access memory (DRAM), or Flash). The storage 335 is generally included to be representative of a non-volatile memory, such as a hard disk drive, solid state device (SSD), removable memory cards, optical storage, or flash memory devices.

In some embodiments, the memory 325 stores cloud provisioning instructions 301 and the storage 335 stores map table 307. However, in various embodiments, the cloud provisioning instructions 301 and the map table 307 are stored partially in memory 325 and partially in storage 335, or they are stored entirely in memory 325 or entirely in storage 335.

When executed by the CPU 305, the cloud provisioning instructions 301 cause the CPU 305 to utilize the map table 307 to implement the cloud provisioning module discussed above with respect to FIG. 2. It is to be noted that although the cloud provisioning instructions 301 and map table 307 are depicted as being stored in and executed/utilized by a device adapter 300, in other embodiments the cloud provisioning instructions 301 and map table 307 can be stored on and executed/utilized by a storage controller such as storage controller 222a and/or storage controller 222b shown in FIG. 2. The cloud provisioning instructions 301 cause the CPU 305 to allocate space on cloud storage devices, such as cloud storage devices 214 depicted in FIG. 2. The space can be allocated statically or on demand as need arises. For example, the space can be allocated a priori or at run time. Furthermore, the cloud storage ranks can be created with different storage capacity.

The cloud provisioning instructions 301 further cause the CPU 305 to group the allocated storage into one or more virtual ranks and to store a mapping between the cloud storage devices and the one or more virtual ranks in the map table 307. In particular, the cloud provisioning instructions 301 cause the CPU 305 to generate the map table 307 which maps the allocated storage space to corresponding virtual local addresses and groups the virtual local addresses to create one or more virtual local ranks or RAID arrays. In this way, the virtual ranks of cloud storage appear as local direct attached ranks to a storage controller communicatively coupled to the device adapter 300 via the I/O device interfaces 350. The I/O device interfaces 350 also communicatively couple the device adapter 300 to local ranks of storage devices, such as solid state drives and nearline drives (e.g. storage drives 216 discussed above). For example, the I/O device interfaces 350 can include fiber optic ports. As used herein, a local rank is a rank or RAID array comprised of storage devices that are directly connected to the device adapter 300 without an intervening wide area network, such as the internet.

When an I/O access (e.g. a read or write request) is received, the cloud conversion instructions 301 cause the CPU 305 to determine if the request is directed to data stored on a virtual rank of cloud storage. When the request is directed to data stored on a virtual rank of cloud storage, the cloud provisioning instructions 301 convert the I/O access (also referred to herein as a data access request or access request) for transmission to the cloud storage device via a cloud interface. For example, the cloud provisioning instructions 301 can convert the I/O access using commands, format, device address, etc. used by the cloud interface to access the cloud storage devices. As used herein, the terms I/O access, read/write access, and data access can be used interchangeably. Exemplary cloud interfaces can include, but are not limited to, the IBM® Cloud Manager or the Amazon® Simple Storage Service (Amazon S3) interface. Thus, as discussed above, the cloud provisioning instructions 301 transparently makes cloud storage available to a storage controller similar to other local storage devices.

In addition, as discussed above the cloud provisioning instructions 301 cause the CPU 305 to dynamically increase storage capacity by creating one or more cloud based ranks as needed to enable more seamless thin provisioning. That is, the storage system associated with the computing device 300 can be provisioned with less local physical storage space than logical storage space and additional physical storage space can be added through the use of cloud based ranks which appear to be local ranks, as discussed above. For example, the cloud provisioning instructions 301 can be configured to cause the CPU 305 to perform a method of thin provisioning using cloud based ranks as described in more detail with respect to FIG. 4.

In addition, the cloud provisioning instructions 303 are configured, in some embodiments to cause the CPU 305 to assign a service level to the cloud based ranks. In some such embodiments, there are three levels of service. However, in other embodiments providing multiple levels of service, two or more than 3 levels of service can be provided. In this example, three levels of service are utilized and the selection of the level of service is based on the compressibility of the data being mirrored, a respective input/output data rate for the virtual local ranks, and a service level agreement. For example, if a service level agreement indicates a low quality of service, the I/O data rate for the virtual local rank is below a threshold, and the data being accessed is compressible, then a first level of service is selected. A low quality of service can be any quality of service below a pre-defined threshold level of service. The first level of service is the lowest level of service from the three options in this example. For example, it can include higher latencies and lower throughput than the other two levels of service. If the service level agreement indicates a low quality of service, the I/O data rate for the virtual local rank is below a threshold, and the data is not compressible, then the second level of service is selected. The second level of service has greater throughput and/or less latency than the first level of service. The last or third level of service is used for all other data (e.g. the SLA indicates a level of service above the pre-defined threshold and/or the I/O data rate is above a threshold). The third level of service has greater throughput and/or less latency than both the first and second levels of service.

By providing differing levels of service, the device adapter 326 is able to leverage the virtual ranks of cloud storage to provide greater flexibility in meeting the customer needs for data storage and access. It is to be noted that although the example first, second, and third levels are described as differing in latency and throughput, other factors can be used to differentiate the levels of service. For example, in some embodiments, the three levels of service have the same latency and throughput, but differ in cost and redundancy level.

Figure 4:
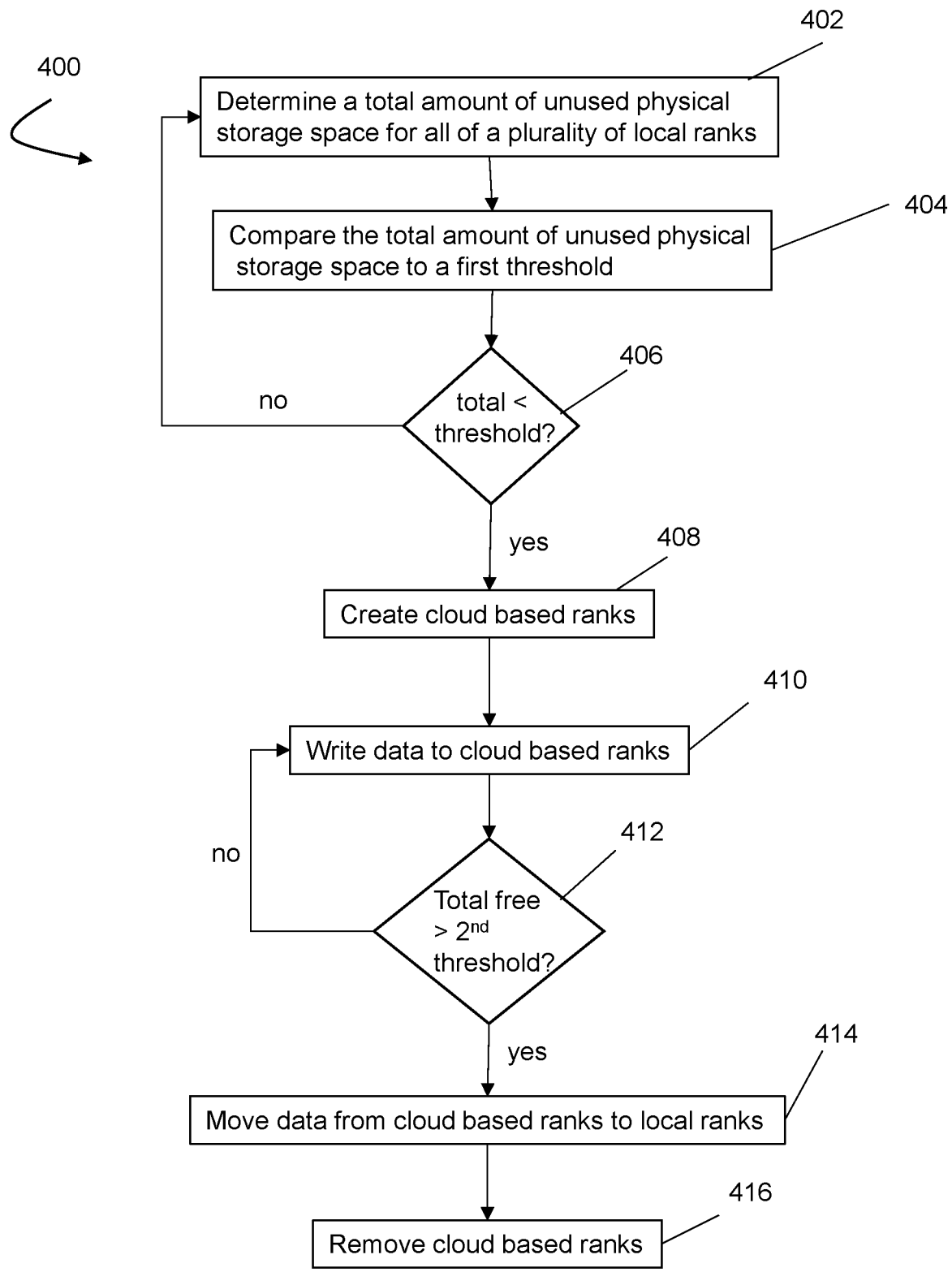
FIG. 4 is a flow chart depicting one embodiment of an example method of thin provisioning using cloud based ranks.

FIG. 4 is a flow chart depicting one embodiment of a method 400 of thin provisioning using cloud based ranks. The method 400 can be implemented by a device adapter, such as device adapters 226, or a storage controller, such as storage controllers 222. For example, the method 400 can be implemented by a CPU, such as CPU 305 in computing device 300, executing instructions, such as cloud provisioning instructions 301. It is to be understood that the order of actions in example method 400 is provided for purposes of explanation and that the method can be performed in a different order in other embodiments. Similarly, it is to be understood that some actions can be omitted or additional actions can be included in other embodiments.

At block 402, a total amount of unused physical storage space for all of the plurality of local ranks associated with a storage controller is determined. This can be determined as the difference between the total storage capacity and the total amount of used storage space.

At block 404, the total amount of unused physical storage space is compared to a first threshold. In some embodiments, the first threshold is predetermined or set a priori. For example, in some embodiments, the first threshold can be set as a percentage of the total storage capacity, e.g. 50%, 70%, etc. In other embodiments, the first threshold can be set as a specific storage amount, e.g. 10 gigabytes (GB), 100 GB, etc.

At block 406, it is determined, based on the comparison, if the total amount of unused physical storage is less than the first threshold. If the total amount of unused physical storage space is less than the first threshold, then one or more cloud based ranks are created at block 408. Each cloud based rank comprises storage space on one or more cloud storage devices. The storage space on the one or more cloud storage devices is mapped to corresponding virtual local addresses that are grouped as a virtual local rank, as discussed above. Additionally, as used herein, cloud storage devices are storage devices accessed via a wide area network, such as the internet, as opposed to a local area network or direct communication link.

Creating the one or more new cloud based ranks includes allocating storage space on one or more corresponding cloud storage devices via a cloud interface. A cloud interface is an interface configured to enable access to the cloud storage devices. For example, the cloud interface can be implemented as an application programming interface (API). Example cloud interfaces are discussed above. Allocating the cloud storage can include requesting via the cloud interface a specified amount of storage.

Creating the new cloud based ranks further includes mapping the allocated storage space to corresponding virtual local addresses. For example, in some embodiments, the device adapter or storage controller assigns the allocated storage space to corresponding virtual local addresses. As used herein, a virtual local address is a memory address which appears as an address of a storage device coupled to the device adapter via a local connection. A local connection refers to a connection that is not over a wide area network or remote network, such as the internet.

Creating the new cloud based ranks further includes grouping the virtual local addresses as virtual local ranks. For example, the device adapter or storage controller is configured to group or arrange the virtual local addresses so that they appear to be directly connected to the device adapter as a local RAID array of storage devices.

At block 410, data is written to the new cloud based ranks. In some embodiments, writing data to the new cloud based ranks can include converting the access request to a cloud data access request configured for an application programming interface (API) corresponding to the one or more cloud storage devices of the one or more cloud based ranks and communicating the cloud data access requests to the one or more corresponding cloud storage devices via the cloud interface.

Furthermore, in some embodiments, writing the data to the new cloud based ranks comprises moving, to the new cloud based ranks, data stored on the plurality of local ranks prior to creating the cloud based ranks. Different algorithms can be used to decide which data to move to the cloud based ranks. For example, in some embodiments, data accessed infrequently is moved while data accessed frequently is kept on the local ranks. In some such embodiments, new data written after creating the one or more cloud based ranks is written to the plurality of local ranks.

In some embodiments, writing data to the new cloud based ranks comprises storing, on the new cloud based ranks, new data written after creating the cloud based ranks. Thus, in some such embodiments, rather than writing new data to the local ranks, new data is written to the cloud based ranks. Thus, in some such embodiments, data stored on the local ranks does not need to be moved to the cloud based ranks.

At block 412, it is determined if a total amount of free space on the plurality of local ranks, subsequent to creating the cloud based ranks, is greater than a second threshold. In some embodiments, the second threshold is predetermined. Additionally, in some embodiments, the second threshold is the same as the first threshold. That is, in some embodiments, the second and first thresholds are set to the same value. In other embodiments, the first and second thresholds are set to respective different values. In particular, in some embodiments, the second threshold corresponds to more free or unused space on the local ranks than the first threshold. For example, the first threshold can be set to correspond to 75% used/25% unused physical storage space, in some embodiments, while the second threshold is set to correspond to 50% used/50% unused. In this way, the storage controller or device adapter can prevent switching back and forth between using cloud based ranks if the used data hovers around the first threshold value.

Furthermore, the total amount of free space determined at block 412 refers to the amount of free space that would be available if the cloud based ranks were not used. For example, the total amount of free space can be determined by subtracting the amount of space used on the cloud based ranks from the unused space on the local ranks. Similarly, the total amount of free space can be determined at block 412 by determining a total amount of used storage space for the plurality of local ranks and the cloud based ranks and then finding a difference between the total capacity of the local ranks (i.e. total amount of storage space for the local ranks) and the total amount of used storage space for the local ranks and the cloud based ranks.

The amount of unused or free space subsequent to creation of the cloud based ranks can increase as data is deleted. For example, often data is created and grows over time until a clean-up job is performed and unneeded data is deleted. This can be a manual deletion by a user. It can also be a function that is part of the advanced management features of the storage system that are available to both the local ranks and the cloud based ranks, such as the features discussed above. As the unneeded data is deleted, storage space is made available or freed up.

If it is determined, at block 412, that the total free space on the local ranks is greater than the second threshold, then data is moved from the cloud based ranks to the local ranks at block 414. If all of the data from the cloud based ranks is moved back to the local ranks at block 414, then the cloud based ranks can optionally be removed or deleted at block 416. Deleting the cloud based ranks includes deallocating the storage space and deleting corresponding entries in the map table. In this way, the cloud based ranks can be dynamically created and deleted as storage space is needed.

As stated above, the order of actions in example method 400 is provided for purposes of explanation and method 400 can be performed in a different order and/or some actions can be omitted or additional actions can be included in other embodiments. Similarly, it is to be understood that some actions can be omitted or additional actions can be included in other embodiments. For example, in some embodiments, blocks 416 is omitted. In such embodiments, the cloud based ranks are not deleted even if no more data remains on one or more of the cloud based ranks after relocating data to one or more of the local RAID arrays. Additionally, it is to be understood that the acts described above do not need to be performed serially.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

EXAMPLE EMBODIMENTS

Example 1 includes a computer-implemented method for thin provisioning using cloud based ranks. The method comprises determining a total amount of unused physical storage space for all of a plurality of local ranks associated with a storage controller; comparing the total amount of unused physical storage space to a first threshold; and creating one or more cloud based ranks in response to determining that the total amount of unused physical storage space is less than the first threshold, creating one or more cloud based ranks. Creating each of the one or more cloud based ranks comprises allocating storage space on one or more corresponding cloud storage devices via a cloud interface; mapping the allocated storage space to corresponding virtual local addresses; and grouping the virtual local addresses as a virtual local rank associated with the storage controller.

Example 2 includes the method of example 1, further comprising storing, on the one or more cloud based ranks, new data written after creating the one or more cloud based ranks.

Example 3 includes the method of any of examples 1-2, further comprising moving, to the one or more cloud based ranks, data stored on the plurality of local ranks prior to creating the one or more cloud based ranks; and storing new data written after creating the one or more cloud based ranks on the plurality of local ranks.

Example 4 includes the method of any of examples 1-3, further comprising converting local data access requests for one of the cloud based ranks to cloud data access requests configured for the cloud interface; and communicating the cloud data access requests to the one or more corresponding cloud storage devices via the cloud interface.

Example 5 includes the method of any of examples 1-4, further comprising determining a total amount of used storage space for the plurality of local ranks and the one or more cloud based ranks; determining a difference between a total amount of storage space for the plurality of local ranks and the determined total amount of used storage space; and moving data from the one or more cloud based ranks to the plurality of local ranks in response to determining that the difference is greater than a second threshold.

Example 6 includes the method of example 5, wherein the first threshold is different from the second threshold.

Example 7 includes the method of any of examples 5-6, further comprising removing the one or more cloud based ranks after moving all of the data from the one or more cloud based ranks to the plurality of local ranks.

Example 8 includes a storage system. The storage system comprises a host adapter having one or more ports configured to communicatively couple the host adapter to one or more host devices; a storage controller comprising a processor and a memory, the storage controller communicatively coupled to the host adapter; and a device adapter comprising a processor and a memory, the device adapter communicatively coupled to the storage controller. The device adapter further comprises a plurality of ports communicatively coupled to a plurality of local storage drives and at least one network port communicatively coupled to a plurality of cloud storage devices via a network. One of the device adapter and the storage controller is further configured to implement a cloud provisioning module. The cloud provisioning module is configured to create one or more cloud based ranks in response to a determination that a total amount of unused physical storage space on the plurality of local storage drives is less than a first predetermined threshold. To create each of the one or more cloud based ranks, the cloud provisioning module is configured to allocate storage space on one or more corresponding cloud storage devices via a cloud interface; assign the allocated storage space to corresponding virtual local addresses; and organize the assigned virtual local addresses into a corresponding virtual local RAID array associated with the storage controller.

Example 9 includes the storage system of example 8, wherein the cloud provisioning module is further configured to store, on the one or more cloud based ranks, new data written after creating the one or more cloud based ranks.

Example 10 includes the storage system of any of examples 8-9, wherein the cloud provisioning module is further configured to move, to the one or more cloud based ranks, data stored on the plurality of local storage drives prior to creating the one or more cloud based ranks; and store new data written after creating the one or more cloud based ranks on the plurality of local storage drives.

Example 11 includes the storage system of any of examples 8-10, wherein the cloud provisioning module is further configured to convert local data access requests for one of the cloud based ranks to cloud data access requests configured for the cloud interface; and communicate the cloud data access requests to the one or more corresponding cloud storage devices via the cloud interface.

Example 12 includes the storage system of any of examples 8-11, wherein the cloud provisioning module is further configured to determine a total amount of used storage space for the plurality of local storage drives and the one or more cloud based ranks; determine a difference between a total amount of storage space for the plurality of local storage drives and the determined total amount of used storage space; and move data from the one or more cloud based ranks to the plurality of local storage drives in response to determining that the difference is greater than a second predetermined threshold.

Example 13 includes the storage system of example 12, wherein the first predetermined threshold is different from the second predetermined threshold.

Example 14 includes the storage system of any of examples 12-13, wherein the cloud provisioning module is further configured to remove the one or more cloud based ranks after moving all of the data from the one or more cloud based ranks to the plurality of local storage drives.

Example 15 includes a computer program product comprising a computer readable storage medium having a computer readable program stored therein. The computer readable program, when executed by a processor, causes the processor to determine a total amount of unused physical storage space for all of a plurality of local redundant array of independent disks (RAID) arrays associated with a storage controller; compare the total amount of unused physical storage space to a first predetermined threshold; and create one or more cloud based ranks in response to determining that the total amount of unused physical storage space is less than the first predetermined threshold. To create each of the one or more cloud based ranks, the computer readable program is configured to cause the processor to allocate storage space on one or more corresponding cloud storage devices via a cloud interface; assign the allocated storage space to corresponding virtual local addresses; and organize the assigned virtual local addresses into a corresponding virtual local RAID array associated with the storage controller.

Example 16 includes the computer program product of example 15, wherein the computer readable program is further configured to cause the processor to store, on the one or more cloud based ranks, new data written after creating the one or more cloud based ranks.

Example 17 includes the computer program product of any of examples 15-16, wherein the computer readable program is further configured to cause the processor to move, to the one or more cloud based ranks, data stored on the plurality of local RAID arrays prior to creating the one or more cloud based ranks; and store new data written after creating the one or more cloud based ranks on the plurality of local RAID arrays.

Example 18 includes the computer program product of any of examples 15-17, wherein the computer readable program is further configured to cause the processor to determine a total amount of used storage space for the plurality of local RAID arrays and the one or more cloud based ranks; determine a difference between a total amount of storage space for the plurality of local RAID arrays and the determined total amount of used storage space; and move data from the one or more cloud based ranks to the plurality of local RAID arrays in response to determining that the difference is greater than a second predetermined threshold.

Example 19 includes the computer program product of example 18, wherein the computer readable program is further configured to cause the processor to remove the one or more cloud based ranks after moving all of the data from the one or more cloud based ranks to the plurality of local RAID arrays.

Example 20 includes the computer program product of any of examples 15-19, wherein the computer readable program is further configured to cause the processor to convert local data access requests for the one or more virtual local RAID arrays to cloud data access requests according to requirements of an application programming interface (API) of the cloud interface.

Example 21 includes a computing device. The computing device comprises a network adapter configured to communicatively couple the computing device to one or more cloud storage devices via a network; a storage medium configured to store data; and a processor communicatively coupled to the network adapter and to the storage medium. The processor is configured to determine a total amount of unused physical storage space for all of a plurality of local ranks; compare the total amount of unused physical storage space to a first threshold; and create one or more cloud based ranks in response to determining that the total amount of unused physical storage space is less than the first threshold. To create each of the one or more cloud based ranks, the processor is configured to allocate storage space on one or more cloud storage devices via an application programming interface (API) associated with the one or more cloud storage devices; and generate a map table which maps the allocated storage space to corresponding virtual local addresses and groups the virtual local addresses to form a corresponding virtual local rank from the allocated storage space on the one or more cloud storage devices, the map table stored on the storage medium.

Example 22 includes the computing device of example 21, wherein the processor is further configured to move, to the one or more cloud based ranks, data stored on the plurality of local ranks prior to creating the one or more cloud based ranks; and store new data written after creating the one or more cloud based ranks on the plurality of local ranks.

Example 23 includes the computing device of any of examples 21-22, wherein the processor is further configured to determine a subsequent total amount of unused storage space for the plurality of local ranks after creating the one or more cloud based ranks; determine a difference between the subsequent total amount of unused storage space and a total amount of used storage space on the one or more cloud based ranks; and move data from the one or more cloud based ranks to the plurality of local ranks in response to determining that the difference is greater than a second threshold.

Example 24 includes the computing device of example 23, wherein the first threshold is different from the second threshold.

Example 25 includes the computing device of any of examples 23-24, wherein the processor is further configured to remove the one or more cloud based ranks after moving all of the data from the one or more cloud based ranks to the plurality of local ranks.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A computer-implemented method comprising:
    monitoring an amount of unused physical storage space on one or more local ranks associated with a storage controller that is communicatively coupled to one or more host devices, each of the local ranks connected to the storage controller via a local connection; and
    in response to determining that the monitored amount of unused physical storage space is less than a first threshold, creating a virtual local rank;
    wherein creating the virtual local rank comprises:
    allocating storage space on one or more cloud storage devices communicatively coupled to the storage controller via an intervening wide area network;
    mapping the allocated storage space to corresponding virtual local addresses that are grouped such that the virtual local rank appears to the storage controller as a local array of storage devices connected to the storage controller without the intervening wide area network;
    monitoring a difference between a total storage capacity of the one or more local ranks and a total amount of used storage on the one or more local ranks and the virtual local rank; and
    in response to determining that the difference is greater than a second threshold, moving at least part of the data on the virtual local rank to the one or more local ranks.

2. The computer-implemented method of claim 1, wherein the first threshold is different from the second threshold.

3. The computer-implemented method of claim 1, further comprising:
    after removing all data on the virtual local rank, deallocating the storage space on the one or more cloud storage devices and deleting entries in a map table which maps the storage space on the one or more cloud storage devices to the corresponding virtual local addresses.

4. The computer-implemented method of claim 1, further comprising storing, on the virtual local rank, new data written after creating the virtual local rank.

5. The computer-implemented method of claim 1, wherein the first threshold is a percentage of total storage capacity of the one or more local ranks.

6. The computer-implemented method of claim 1, further comprising assigning a service level to the virtual local rank based on compressibility of data written to the virtual local rank, an input/output data rate for the virtual local rank, and a service level agreement.

7. The computer-implemented method of claim 1, wherein the storage controller is further configured to assign a service level to the virtual local rank based on compressibility of data written to the virtual local rank, an input/output data rate for the virtual local rank, and a service level agreement.

8. A storage system comprising:
a host adapter having one or more ports configured to communicatively couple the host adapter to one or more host devices;
a storage controller comprising a processor and a memory, the storage controller communicatively coupled to the host adapter; and
a device adapter comprising a processor and a memory, the device adapter communicatively coupled to the storage controller;
wherein the device adapter further comprises a plurality of ports communicatively coupled to a plurality of local storage drives via a local connection and at least one network port communicatively coupled to one or more cloud storage devices via an intervening wide area network;
wherein, in response to determining that an amount of unused physical storage space on the plurality of local storage drives is less than a first threshold, the device adapter is further configured to create a virtual local rank by allocating storage space on the one or more cloud storage devices and mapping the allocated storage space to corresponding virtual local addresses that are grouped such that the virtual local rank appears to the storage controller as a local array of storage devices connected to the storage controller without the intervening wide area networks;
wherein the storage controller is further configured to:
monitor a difference between a total storage capacity of the plurality of local storage drives and a total amount of used storage on the plurality of local storage drives and the virtual local rank; and
in response to determining that the difference is greater than a second threshold, move at least part of the data on the virtual local rank to one or more of the plurality of local storage drives.

9. The system of claim 8, wherein the first threshold is different from the second threshold.

10. The system of claim 8, wherein the device adapter is further configured to, after all data on the virtual local rank is removed, deallocate the storage space on the one or more cloud storage devices and delete entries in a map table which maps the storage space on the one or more cloud storage devices to the corresponding virtual local addresses.

11. The system of claim 8, wherein the storage controller is further configured to store, on the virtual local rank, new data written after creation of the virtual local rank.

12. The system of claim 8, wherein the first threshold is a percentage of total storage capacity of the plurality of local storage drives.

13. A computer program product comprising a computer readable storage medium having a computer readable program stored therein, wherein the computer readable program, when executed by a processor, causes the processor to:
monitor an amount of unused physical storage space on one or more local ranks associated with a storage controller that is communicatively coupled to one or more host devices, each of the local ranks connected to the storage controller via a local connection; and
in response to determining that the monitored amount of unused physical storage space is less than a first threshold, create a virtual local rank;
wherein the computer readable program causes the processor to create the virtual local rank by:
allocating storage space on one or more cloud storage devices communicatively coupled to the storage controller via an intervening wide area network;
mapping the allocated storage space to corresponding virtual local addresses that are grouped such that the virtual local rank appears to the storage controller as a local array of storage devices connected to the storage controller without the intervening wide area network;
monitor a difference between a total storage capacity of the one or more local ranks and a total amount of used storage on the one or more local ranks and the virtual local rank; and
in response to determining that the difference is greater than a second threshold, move at least part of the data on the virtual local rank to the one or more local ranks.

14. The computer program product of claim 13, wherein the first threshold is different from the second threshold.

15. The computer program product of claim 13, wherein the computer readable program is further configured to cause the processor to, after all data on the virtual local rank is removed, deallocate the storage space on the one or more cloud storage devices and delete entries in a map table which maps the storage space on the one or more cloud storage devices to the corresponding virtual local addresses.

16. The computer program product of claim 13, wherein the first threshold is a percentage of total storage capacity of the one or more local ranks.

17. The computer program product of claim 13, wherein the computer readable program is further configured to cause the processor to assign a service level to the virtual local rank based on compressibility of data written to the virtual local rank, an input/output data rate for the virtual local rank, and a service level agreement.

* * * * *